(12) United States Patent
Sumpter (10) Patent No.: US 9,381,982 B1
(45) Date of Patent: Jul. 5, 2016

(54) GPS LOCATABLE MULTI-PURPOSE LIFE JACKET SYSTEM

(71) Applicant: Kevin Sumpter, Bronx, NY (US)

(72) Inventor: Kevin Sumpter, Bronx, NY (US)

(*) Notice: Subject to any disclaimer, the term of this patent is extended or adjusted under 35 U.S.C. 154(b) by 0 days.

(21) Appl. No.: 14/324,009

(22) Filed: Jul. 3, 2014

Related U.S. Application Data (60) Provisional application No. 61/844,055, filed on Jul. 9, 2013.

(51) Int. Cl.
| | |
|---|---|
| *B63C 9/08* | (2006.01) |
| *B63C 9/20* | (2006.01) |
| *B63C 9/11* | (2006.01) |
| *B63C 9/125* | (2006.01) |
| *G01S 1/04* | (2006.01) |

(52) U.S. Cl.
CPC ... *B63C 9/20* (2013.01); *B63C 9/11* (2013.01); *B63C 9/1255* (2013.01); *G01S 1/042* (2013.01)

(58) Field of Classification Search
CPC ........ B63C 9/125; B63C 9/1255; B63C 9/15; B63C 9/155
USPC ................................ 441/108, 123
See application file for complete search history.

(56) References Cited

U.S. PATENT DOCUMENTS

| | | | |
|---|---|---|---|
| 6,439,941 B2 | 8/2002 | McClure et al. | |
| 6,659,689 B1 * | 12/2003 | Courtney et al. | ............. 405/186 |
| 7,053,822 B2 * | 5/2006 | Rickerson, Jr. | .......... 342/357.54 |
| 7,854,639 B1 | 12/2010 | Leal et al. | |
| 2006/0012483 A1 * | 1/2006 | Ethington | ................. 340/573.6 |

* cited by examiner

*Primary Examiner* — Stephen Avila
(74) *Attorney, Agent, or Firm* — RG Patent Consulting, LLC; Rachel Gilboy (57) ABSTRACT

The GPS locatable multi-purpose life jacket system is a survival vest having usefulness in a wide variety of unfortunate situations. The vest has a GPS transmitter that transmits the wearer's location and has a multi-colored light having blue and red strobe lights visually indicating the location of the distressed wearer in a dark environment, and a white light for using as a flash light in dark locations. A removable floatation collar is attached about the neck opening which may be automatically inflated via a $CO_2$ cylinder, to act as a life jacket, if water submersion is detected for more than thirty seconds. The red and blue lights of the multi-colored light may also be automatically activated, but can also be manually activated. The vest has pockets for carrying an I.D. card, means to start a fire, and tools for emergency survival.

19 Claims, 5 Drawing Sheets

GPS LOCATABLE MULTI-PURPOSE LIFE JACKET SYSTEM

CROSS-REFERENCE TO RELATED APPLICATION

The present application is related to and claims priority from prior provisional application Ser. No. 61/844,055, filed Jul. 9, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of flotation devices and more specifically relates to a GPS locatable multi-purpose life jacket system.

2. Description of the Related Art

In the protected, insulated, climate-controlled world that technology provides for us, its easy to forget the fact that nature, which waits just outside, can be cruel and unforgiving. Many outdoor enthusiasts can recount stories of getting lost in unfamiliar territory which ends up as a battle for sheer survival. A weekend hiker sets out alone to traverse steep terrain on a remote trail, falls, breaks an ankle and comes to rest well below the trail, hidden from view in the trees. A motorist loses control of his vehicle on an icy road, goes off the road into a ravine and is suddenly not only injured, but stranded and out of sight. In these and countless other examples, a person can be fine one moment, enjoying the comforts and amenities that our civilization provides and the next minute find himself or herself face-to-face with the pitiless fact that nature really knows and cares nothing about us.

Many times campers or hikers who have become lost have been able to see rescue planes or helicopters flying overhead, but could not get the attention of the pilots, or a crash victim that was unable to move but ended up out of sight from the traveled road. Boating accident victims sometimes drift for days or weeks while rescue missions are taking place, in the wrong areas. The lucky victims get to survive, but all too often it does not end well. An invention that could dramatically increase a person's chances of not only surviving, but being found relatively quickly is needed.

Various attempts have been made to solve the above-mentioned problems such as those found in U.S. Pat. No. 7,053,822 to Donald Rickerson, Jr., U.S. Pat. No. 6,439,941 to Richard J. McClure et al, U.S. Pub. No. 2006/0012483 to Billy Ethington, and U.S. Pat. No. 7,854,639 to Amy J. Tangen. This art is representative of floatation devices. None of the above inventions and patents, taken either singly or in combination, is seen to describe the invention as claimed.

Ideally, a survival vest should provide an electronic location means and multi-colored lighting as well as I.D. card and survival tools, and yet, would operate reliably and be manufactured at a modest expense. Thus, a need exists for a reliable GPS locatable multi-purpose life jacket system to avoid the above-mentioned problems.

BRIEF SUMMARY OF THE INVENTION

In view of the foregoing disadvantages inherent in the known floatation vest art, the present invention provides a novel GPS locatable multi-purpose life jacket system. The general purpose of the present invention, which will be described subsequently in greater detail is to provide an emergency vest having electronic location means and multi-colored strobe and flash lighting as well as I.D. card and survival tools.

The present invention, GPS locatable multi-purpose life jacket system as disclosed herein, preferably comprises an emergency vest assembly having a vest body with a neck opening, a right shoulder, a left shoulder, a front side having a front opening, a vest fastener, a plurality of pockets, a back side, a removable floatation collar, a global positioning transmitter comprising a transmitter activator and a pull cord, and a multi-colored light.

The emergency vest assembly having the vest body having the neck opening, the right shoulder, the left shoulder, the front side having the front opening, the vest fastener, the plurality of pockets, the back side, the removable floatation collar, the global positioning transmitter having the transmitter activator and the pull cord, and the multi-colored light, are all structured and arranged so that the components operate together in functional combination to form an effective multipurpose emergency vest. The emergency vest assembly preferably comprises a high visibility reflective orange coloring but may be a high visibility reflective yellow-green color. The vest body having the neck opening, the right shoulder, the left shoulder, the front side, and the back side parts are integrally formed such that this portion of the vest body is of a unitary design. The vest body is preferably buoyant, but may instead have non-removably attached portions that are buoyant. The vest body preferably comprises at least one inflatable chamber that may be user activated via a $CO_2$ cylinder. The inflatable chamber(s) may wrap around the vest body, which is in addition to the removable floatation collar.

The vest fastener is non-removably attached along a vertical length of each side of the front opening. The front opening may be closeable via a zipper fastener, but may be hook and loop fasteners. The front opening of the vest body may comprise closure straps having snap-lock buckles in addition to a zipper or hook and loop fasteners. The closure system may be any combination of these depending upon the embodiment.

The pockets are non-removably attached about the exterior surface of the vest body, each pocket having an inner volume with a top opening and of sufficient size to comfortably carry critical survival supplies. The removable floatation collar is structured and arranged to be removably attached to a top edge of the neck opening. The removable floatation collar may be an additional floatation device to the vest body or may be the only floatation device for the emergency vest assembly depending upon the embodiment. The emergency vest assembly is modular in a sense that the removable floatation collar is replaceable with a new collar or a collar of a different type or function. The removable floatation collar may comprise closed-cell polymeric foam or may be manually or automatically inflatable using a $CO_2$ cylinder, triggered by the same transmitter activator that automatically activates the GPS signal after 30 seconds of submersion under water. All components of the emergency vest assembly are water proof.

The global positioning transmitter may be removably attached between the inner surface and the outer surface of the left shoulder, but may be attached to the right shoulder. The pull cord may be removably attached to the transmitter activator of the global positioning transmitter. The transmitter activator may be located internally of the global positioning transmitter and accessed externally, or may have a sensor located close to the bottom of the vest assembly for automatic activation. The transmitter activator is structured and arranged to be activated automatically by a 30 second contact with water or by manually pulling the pull cord. The multi-colored light may be removably attached to the right shoulder, but may be attached to the left shoulder.

The multi-colored light and the GPS transmitter may be interchangeable so that either may be placed on the user preferred shoulder. The multi-colored light preferably comprises a blue light, a red light, and a white light. The blue light and the red light are high visibility strobe lights while the white light is a forward-facing flashlight. The multi-colored light preferably comprises long life and low energy usage light emitting diodes, operable via a long life battery for long periods of usage between charges. The emergency vest assembly is very useful for wearing during an outdoor outing so that the user is able to be located via the multi-colored light and the global positioning transmitter by a rescuer in the event that the user becomes lost or gets in an accident.

A kit is embodied herein for the GPS locatable multi-purpose life jacket system preferably comprising an emergency vest assembly having a removable floatation collar, a global positioning transmitter having a transmitter activator, a pull cord for manual activation of the GPS transmitter, a multi-colored light, and at least one set of user instructions.

In accordance with the embodiments of the present invention, a preferred method of use is disclosed herein preferably comprising the steps of donning an assembled emergency vest assembly, zipping up the emergency vest assembly, activating the multi-colored light, activating the removable floatation collar of the emergency vest assembly, removing the emergency vest assembly, and storing the emergency vest assembly.

The present invention holds significant improvements and serves as a GPS locatable multi-purpose life jacket system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, GPS locatable multi-purpose life jacket system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an emergency floatation vest and more particularly, to a GPS locatable multi-purpose life jacket system as used to improve the likelihood of being rescued when the user is lost.

Generally speaking, the GPS locatable multi-purpose life jacket system is a survival vest having a usefulness in a wide variety of unfortunate situations. The vest has a GPS transmitter that transmits the wearer's location and has a multi-colored light having blue and red strobe lights visually indicating the location of the distressed wearer in a dark environment, and a white light for using as a flash light in dark locations. A removable floatation collar is attached about the neck opening which may be automatically inflated via a $CO_2$ cylinder if water submersion is detected for more than thirty seconds. The red and blue lights of the multi-colored light may also be automatically activated, but can also be manually activated. The vest has pockets for carrying an I.D. card, means to start a fire, and tools for emergency survival. The vest may also comprise an inline hood (zipped or buttoned to the vest) to help in preventing hypothermia. The hood may be used (when user-wearer is located on land surfaces) in the capacity of a bucket from which to drink from or carry water or the like. The device may further comprise a solar panel strip to charge batteries as necessary.

Figure 1:
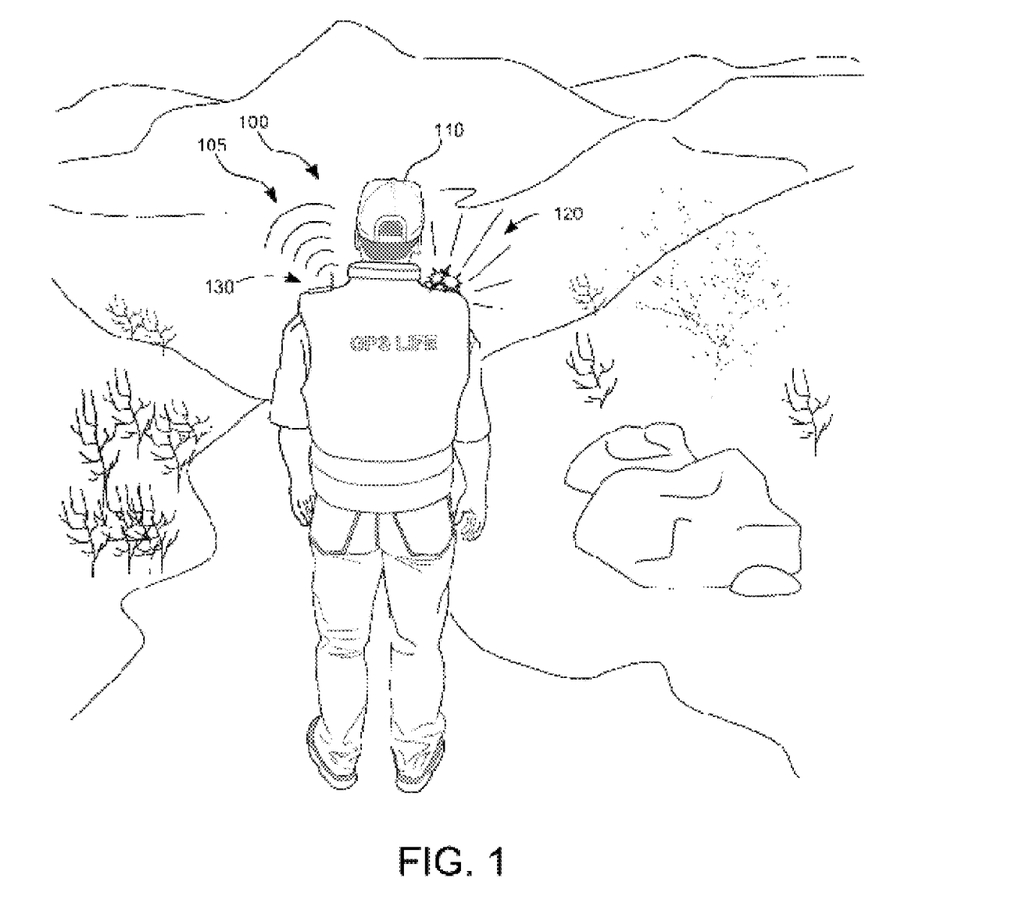
FIG. 1 shows a perspective view illustrating an in-use condition of a GPS locatable multi-purpose life jacket system according to an embodiment of the present invention.

Referring to the drawings by numerals of reference there is shown in FIG. 1, a perspective view illustrating an in-use condition of GPS locatable multi-purpose life jacket system 100 according to an embodiment of the present invention.

Emergency vest assembly 105 is very useful for wearing during an outdoor outing (camping, boating, hiking or the like) so that user 110 is able to be located via multi-colored light 120 and global positioning transmitter 130 by a rescuer in the event that user 110 becomes lost or gets in an accident. Gps locatable multi-purpose life jacket system 100 preferably comprises emergency vest assembly 105 having vest body 150 with neck opening 160, right shoulder 170, left shoulder 180, front side 190 having front opening 199, vest fastener 200, a plurality of pockets 210, back side 220, removable floatation collar 140, global positioning transmitter 130 comprising transmitter activator 240 and pull cord 250, and multi-colored light 120. Emergency vest assembly 105 preferably provides locating, floatation, night visibility, and survival assessory functions for accident victims, victims of a capsized boat, or user(s) 110 becoming lost in an unfamiliar environment. Emergency respondents may be able to receive the transmitted signal of the gps location and at night, see blue light 122 and red light 124 of multi-colored light 120 flashing from a considerable distance.

Figure 2:
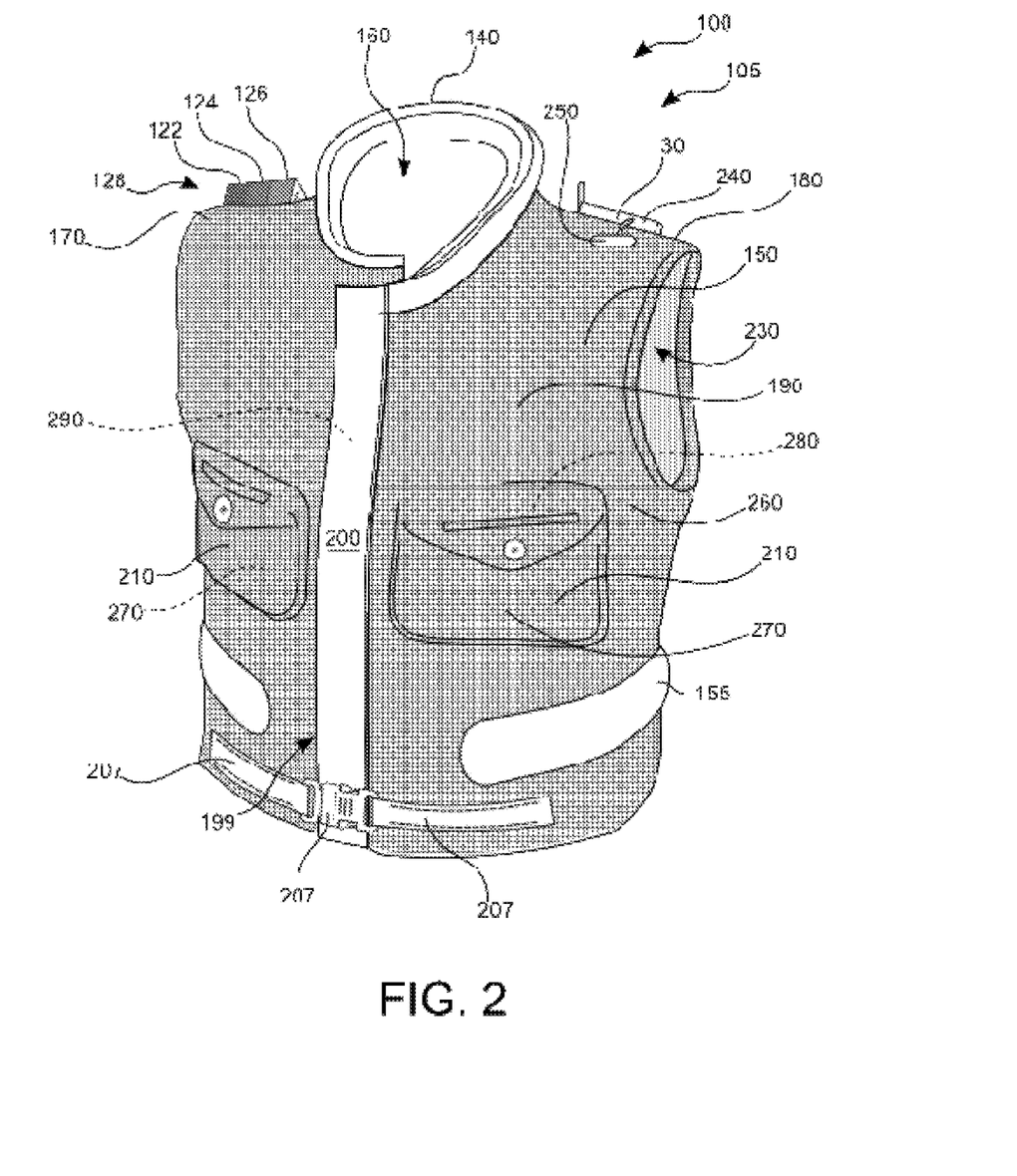
FIG. 2 is a front side view illustrating the GPS locatable multi-purpose life jacket system according to an embodiment of the present invention of FIG. 1.

Referring now to FIG. 2, a front side view illustrating GPS locatable multi-purpose life jacket system 100 according to an embodiment of the present invention of FIG. 1.

Emergency vest assembly 105 has vest body 150 having neck opening 160, right shoulder 170, left shoulder 180, front side 190 having front opening 199, vest fastener 200, a plurality of pockets 210, back side 220, removable floatation collar 140, global positioning transmitter 130 having transmitter activator 240 and pull cord 250, and multi-colored light 120, are all structured and arranged so that components operate together in functional combination to form an effective multipurpose emergency vest assembly 105.

Global positioning transmitter 130 may be removably attached between inner surface 230 and outer surface 260 of left shoulder 180, but may be attached to right shoulder 170. Pull cord 250 may be removably attached to transmitter activator 240 of global positioning transmitter 130. Transmitter activator 240 may be located internally of global positioning transmitter 130 and accessed externally, or may have a sensor located close to bottom of vest assembly for automatic activation. Transmitter activator 240 is structured and arranged to be activated automatically by a 30 second contact with water or by manually pulling pull cord 250. Multi-colored light 120 may be removably attached to right shoulder 170, but may be attached to left shoulder 180 in some embodiments. Pockets 210 are non-removably attached about exterior surface of vest body 150, each pocket(s) 210 having an inner volume 270 with top opening 280 and of sufficient size to comfortably carry critical survival supplies.

Vest fastener 200 is non-removably attached along a vertical length of each side of front opening 199. Front opening 199 may be closeable via zipper fastener 290, but may be hook and loop fasteners in other embodiments. Front opening 199 of vest body 150 may comprise closure straps 205 having snap-lock buckles 207 in addition to zipper fastener 290 or hook and loop fasteners. The particular closure method may be any combination of these depending upon embodiment. Other fastening means may be used.

Figure 3:
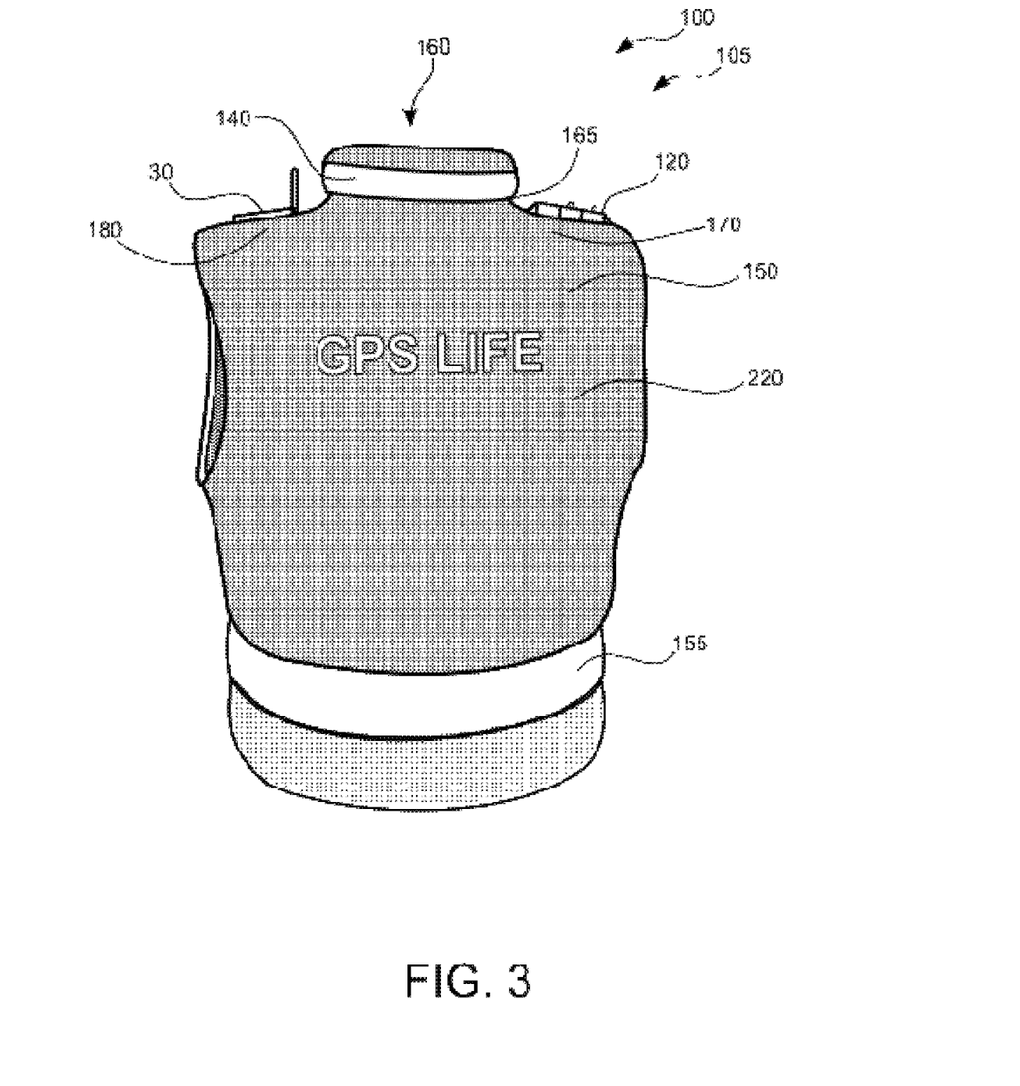
FIG. 3 is a back side view illustrating the GPS locatable multi-purpose life jacket system according to an embodiment of the present invention of FIG. 1.

Referring now to FIG. 3, a back side view illustrating GPS locatable multi-purpose life jacket system 100 according to an embodiment of the present invention of FIG. 1.

Emergency vest assembly 105 preferably comprises a high visibility reflective orange coloring but may be a high visibility reflective yellow-green color. Vest body 150 having neck opening 160, right shoulder 170, left shoulder 180, front side 190, and back side 220 parts are integrally formed such that this portion of vest body 150 is of a unitary design. Vest body 150 is preferably buoyant, but may instead have non-removably attached portions that are buoyant. Vest body 150 preferably comprises at least one inflatable chamber 155 that may be user(s) 110 activated via a $CO_2$ cylinder. Inflatable chamber 155 may wrap around vest body 150, which is in addition to removable floatation collar 140.

Removable floatation collar 140 is structured and arranged to be removably attached to top edge 165 of neck opening 160. Removable floatation collar 140 may be an additional floatation device to vest body 150 or may be the only floatation device for emergency vest assembly 105 depending upon embodiment. Emergency vest assembly 105 is modular in the sense (aspect) that removable floatation collar 140 is replaceable with a new collar or a collar of a different type or function. Removable floatation collar 140 may comprise closed-cell polymeric foam or may be manually or automatically inflatable using a $co_2$ cylinder, triggered by the same transmitter activator 240 that automatically activates the GPS signal after 30 seconds of submersion under water. All components of emergency vest assembly 105 are water proof.

Figure 4:
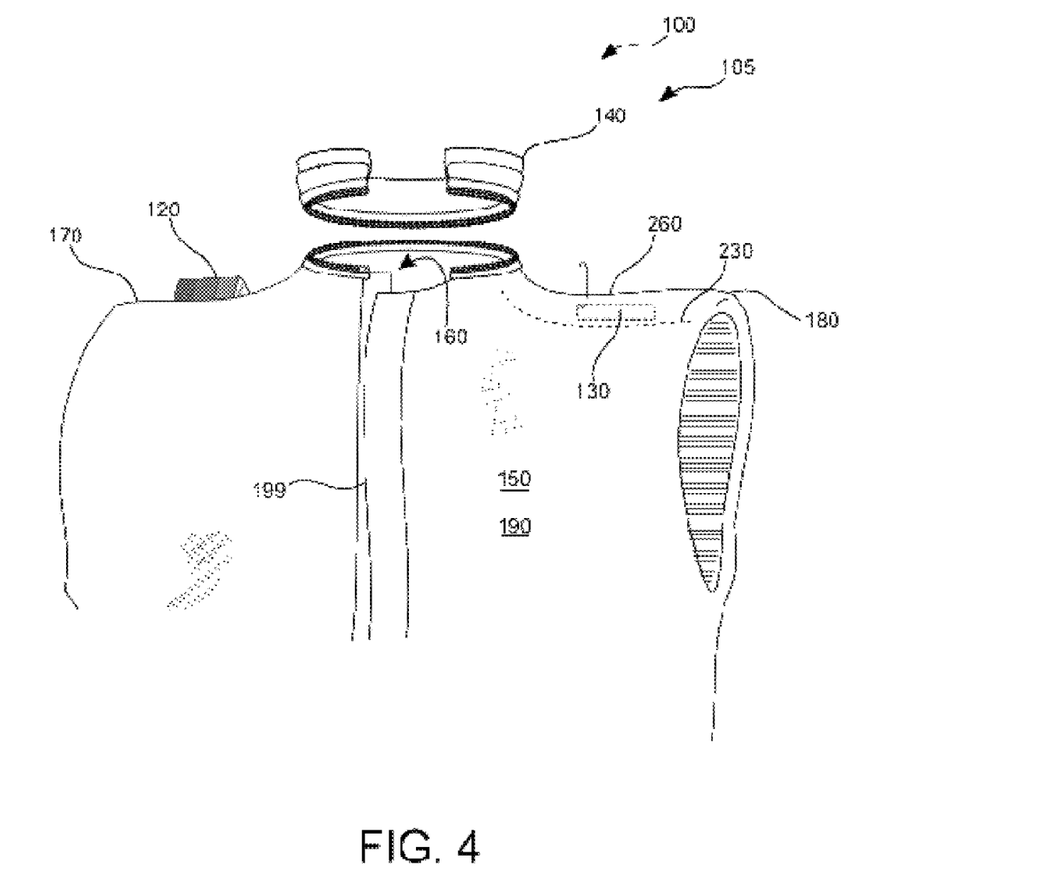
FIG. 4 is a perspective view illustrating the multi-colored light and the global positioning transmitter of the GPS locatable multi-purpose life jacket system according to an embodiment of the present invention of FIG. 1.

Referring now to FIG. 4, showing a perspective view illustrating multi-colored light 120 and global positioning transmitter 130 of GPS locatable multi-purpose life jacket system 100 according to an embodiment of the present invention of FIG. 1.

Multi-colored light 120 and global positioning transmitter 130 may be interchangeable so that either may be placed on either left shoulder 180 or right shoulder 170. Multi-colored light 120 preferably comprises blue light 122, red light 124, and white light 126. Blue light 122 and red light 124 are high visibility strobe lights while white light 126 may be a forward-facing flashlight or act as a lantern. White light 126 may also act as a lantern to provide a wide angle of light. Multi-colored light 120 preferably comprises long life and low energy usage light emitting diodes 128, operable via a long life battery for long periods of usage between charges.

GPS locatable multi-purpose life jacket system 100 may be sold as kit 440 comprising the following parts: at least one emergency vest assembly 105 having removable floatation collar 140; at least one global positioning transmitter 130 having a transmitter activator 240; at least one pull cord 250 for manual activation of the global positioning transmitter 130; at least one multi-colored light 120; and at least one set of user instructions. The kit has instructions such that functional relationships are detailed in relation to the structure of the invention (such that the invention can be used, maintained, or the like in a preferred manner). GPS locatable multi-purpose life jacket system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different light color combinations, parts may be sold separately, etc., may be sufficient.

Figure 5:
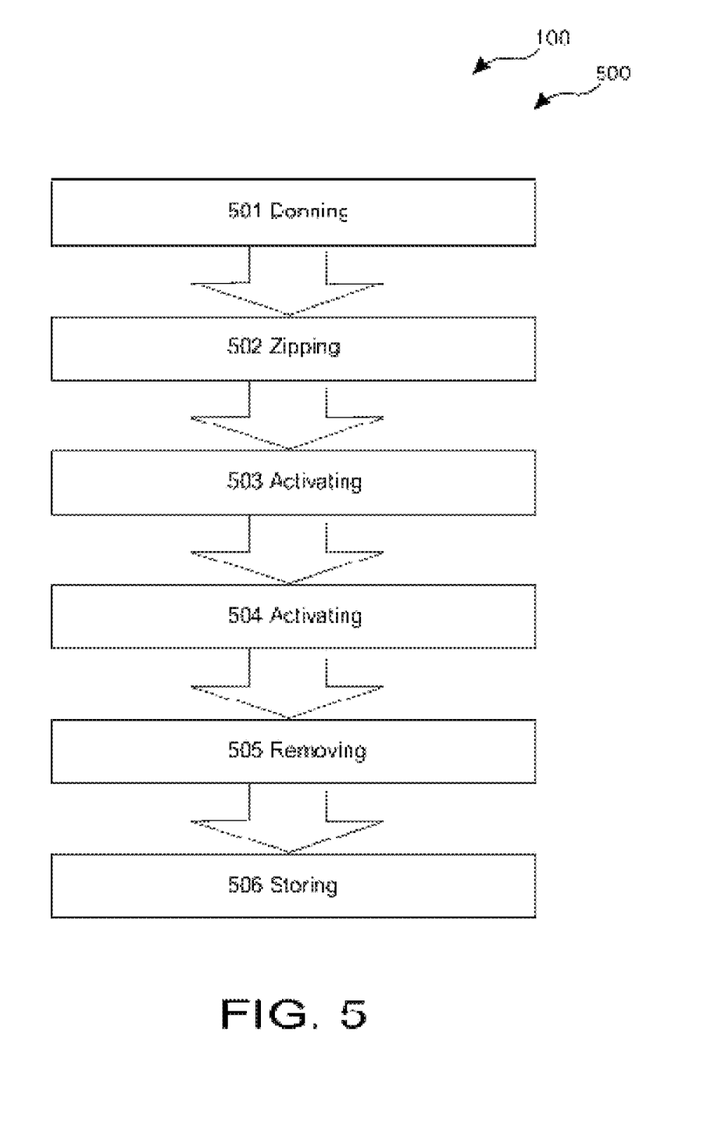
FIG. 5 is a flowchart illustrating a method of use for the GPS locatable multi-purpose life jacket system according to an embodiment of the present invention of FIGS. 1-4.

Referring now to FIG. 5, showing method of use 500 for GPS locatable multi-purpose life jacket system 100. A method of using GPS locatable multi-purpose life jacket system 100 may comprise the steps of step one 501 donning assembled emergency vest assembly 105; step two 502 zipping up emergency vest assembly 105; step three 503 activating multi-colored light 120; step four 504 activating removable floatation collar 140 of emergency vest assembly 105; step five 505 removing emergency vest assembly 105; and step six 506 storing emergency vest assembly 105.

It should be noted that steps 503 and 504 is an optional step and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A gps locatable multi-purpose life jacket system comprising:
   an emergency vest assembly comprising;
      a vest body having;
         a neck opening;
         a right shoulder;
         a left shoulder;
         a front side having;
            a front opening;
            a vest fastener;
            a plurality of pockets; and
         a back side; and
      a removable floatation collar; and
      a global positioning transmitter comprising;
         a transmitter activator; and
         a pull cord; and
      a multi-colored light;
   wherein said emergency vest assembly comprises said vest body having said neck opening, said right shoulder, said left shoulder, said front side having said front opening, said vest fastener, and said plurality of pockets, said back side, said removable floatation collar, said global positioning transmitter having said transmitter activator and said pull cord, and said multi-colored light, all in functional combination;
   wherein said neck opening, said right shoulder, said left shoulder, said front side, and said back side of said vest body are integrally formed;
   wherein said vest fastener is non-removably attached along a vertical length of each side of said front opening;
   wherein said plurality of pockets are non-removably attached about an exterior surface of said vest body such that each pocket has an inner volume and a top opening;
   wherein said removable floatation collar is structured and arranged to be removably attached to a top edge of said neck opening;
   wherein said global positioning transmitter is removably attached between an inner surface and an outer surface of said left shoulder;
   wherein said pull cord is removably attached to said transmitter activator of said global positioning transmitter, said transmitter activator located internally of said global positioning transmitter and accessed externally;
   wherein said transmitter activator is structured and arranged to be activated automatically by a 30 second contact with a water and alternately by pulling said pull cord;
   wherein said multi-colored light is removably attached to said right shoulder; and
   wherein said emergency vest assembly is useful for a user to wear during an outdoor outing such that said user is able to be located by a rescuer in an event that said user becomes lost via said multi-colored light and said global positioning transmitter.

2. The gps locatable multi-purpose life jacket system of claim 1 wherein said removable floatation collar comprises an additional floatation device to said vest body.

3. The gps locatable multi-purpose life jacket system of claim 1 wherein said multi-colored light comprises a blue light, a red light, and a white light.

4. The gps locatable multi-purpose life jacket system of claim 1 wherein said blue light and said red light comprises strobe lights.

5. The gps locatable multi-purpose life jacket system of claim 1 wherein said white light comprises a forward-facing flashlight.

6. The gps locatable multi-purpose life jacket system of claim 3 wherein said multi-colored light comprises light emitting diodes.

7. The gps locatable multi-purpose life jacket system of claim 6 wherein said multi-colored light is activated via a long life battery.

8. The gps locatable multi-purpose life jacket system of claim 2 wherein said removable floatation collar is self-inflatable.

9. The gps locatable multi-purpose life jacket system of claim 1 wherein said vest body is buoyant.

10. The gps locatable multi-purpose life jacket system of claim 1 wherein said front opening is closeable via a zipper fastener.

11. The gps locatable multi-purpose life jacket system of claim 9 wherein said vest body comprises at least one inflatable chamber.

12. The gps locatable multi-purpose life jacket system of claim 1 wherein said at least one inflatable chamber wraps around said vest body.

13. The gps locatable multi-purpose life jacket system of claim 1 wherein said removable floatation collar comprises closed-cell polymeric foam.

14. The gps locatable multi-purpose life jacket system of claim 1 wherein said front opening of said vest body comprises closure straps having snap-lock buckles.

15. The gps locatable multi-purpose life jacket system of claim 1 wherein said emergency vest assembly comprises a high visibility reflective orange coloring.

16. The gps locatable multi-purpose life jacket system of claim 1 wherein said emergency vest assembly is modular such that said removable floatation collar is replaceable with a second collar.

17. The gps locatable multi-purpose life jacket system of claim 1 wherein said removable floatation collar is manually inflatable.

18. A gps locatable multi-purpose life jacket system comprising:
   an emergency vest assembly comprising;
      a vest body having;
         a neck opening;
         a right shoulder;
         a left shoulder;
         a front side having;
            a front opening;
            a vest fastener;
            a plurality of pockets; and
         a back side; and
      a removable floatation collar;
      a global positioning transmitter comprising;
         a transmitter activator; and
         a pull cord; and a multi-colored light;
wherein said emergency vest assembly comprises said vest body having said neck opening, said right shoulder, said left shoulder, said front side having said front opening, said vest fastener, and said plurality of pockets, said back side, said removable floatation collar, said global positioning transmitter having said transmitter activator and said pull cord, and said multi-colored light, all in functional combination;
wherein said emergency vest assembly comprises a high visibility reflective orange coloring;
wherein said neck opening, said right shoulder, said left shoulder, said front side, and said back side of said vest body are integrally formed;
wherein said vest body is buoyant;
wherein said vest body comprises at least one inflatable chamber;
wherein said at least one inflatable chamber wraps around said vest body;
wherein said vest fastener is non-removably attached along a vertical length of each side of said front opening;
wherein said front opening is closeable via a zipper fastener;
wherein said front opening of said vest body comprises closure straps having snap-lock buckles;
wherein said plurality of pockets are non-removably attached about an exterior surface of said vest body such that each pocket has an inner volume and a top opening;
wherein said removable floatation collar is structured and arranged to be removably attached to a top edge of said neck opening;
wherein said removable floatation collar comprises an additional floatation device to said vest body;
wherein said emergency vest assembly is modular such that said removable floatation collar is replaceable with a second collar;
wherein said removable floatation collar comprises closed-cell polymeric foam;
wherein said removable floatation collar is manually inflatable;
wherein said global positioning transmitter is removably attached between an inner surface and an outer surface of said left shoulder;
wherein said pull cord is removably attached to said transmitter activator of said global positioning transmitter, said transmitter activator located internally of said global positioning transmitter and accessed externally;
wherein said transmitter activator is structured and arranged to be activated automatically by a 30 second contact with a water and alternately by pulling said pull cord;
wherein said multi-colored light is removably attached to said right shoulder;
wherein said multi-colored light comprises a blue light, a red light, and a white light;
wherein said blue light and said red light comprises strobe lights;
wherein said white light comprises a forward-facing flashlight;
wherein said multi-colored light comprises light emitting diodes;
wherein said multi-colored light is activated via a long life battery; and
wherein said emergency vest assembly is useful for a user to wear during an outdoor outing such that said user is able to be located by a rescuer in an event that said user becomes lost via said multi-colored light and said global positioning transmitter.

19. The gps locatable multi-purpose life jacket system of claim 18 further comprising a kit including:
said emergency vest assembly comprising said removable floatation collar;
said global positioning transmitter having said transmitter activator and said pull cord;
said multi-colored light; and
at least one set of user instructions.

* * * * *